United States Patent [19]
Volz et al.

[11] Patent Number: 6,003,958
[45] Date of Patent: Dec. 21, 1999

[54] HYDRAULIC BRAKE SYSTEM WITH SLIP CONTROL

[75] Inventors: Peter Volz, Dermstadt; Hans-Dieter Reinartz, Frankfurt am Main; Erhard Beck, Weilburg, all of Germany

[73] Assignee: ITT Manufacturing Enterprises Inc., Wilmington, Del.

[21] Appl. No.: 08/765,563

[22] PCT Filed: Jun. 20, 1995

[86] PCT No.: PCT/EP95/02376

§ 371 Date: Apr. 10, 1997

§ 102(e) Date: Apr. 10, 1997

[87] PCT Pub. No.: WO96/00671

PCT Pub. Date: Jan. 11, 1996

[30] Foreign Application Priority Data

Jun. 29, 1994 [DE] Germany ............... 44227838

[51] Int. Cl.⁶ ............................................. B60T 8/36
[52] U.S. Cl. ............................. 303/116.1; 303/84.2
[58] Field of Search ............... 303/84.1, 84.2, 303/116.1, 113.1, 10, DIG. 1; 137/110, 115.16, 508

[56] References Cited

U.S. PATENT DOCUMENTS

| 4,957,330 | 9/1990 | Morikawa et al. . |
| 5,046,788 | 9/1991 | Lindenman ............... 303/84.1 X |

FOREIGN PATENT DOCUMENTS

| 0317305 | 5/1989 | European Pat. Off. . |
| 0423755 | 4/1991 | European Pat. Off. . |
| 2680742 | 3/1993 | France . |
| 3641922 | 6/1987 | Germany . |
| 3838571 | 5/1990 | Germany . |
| 4010841 | 10/1991 | Germany . |
| 4016755 | 11/1991 | Germany . |
| 4201731 | 7/1993 | Germany . |
| 4213710 | 10/1993 | Germany . |
| 2252140 | 7/1992 | United Kingdom . |
| 2259340 | 3/1993 | United Kingdom . |
| WO9216397 | 10/1992 | WIPO . |
| WO9509099 | 4/1995 | WIPO . |

*Primary Examiner*—Robert J. Oberleitner
*Assistant Examiner*—Sarah M. Sawhill
*Attorney, Agent, or Firm*—Rader, Fishman & Grauer PLLC

[57] ABSTRACT

The present invention relates to a hydraulic brake system with slip control, including a braking pressure generator which is connected hydraulically to at least one wheel brake by way of a main pressure line, a return line connected to the wheel brake and in communication with a pressure fluid collecting device, an auxiliary-pressure pump having an auxiliary-pressure line which is connected to the braking pressure generator, and at least one pressure modulation valve acting in the main pressure line and in the return line to close or keep open the pressure fluid passage in the main pressure line and the return line. An orifice is arranged in the main pressure line between the pressure modulation valve and the wheel brake, and an unimpeded hydraulic passage between the main pressure line and the wheel brake is provided in a first switch position, and the orifice limits the pressure fluid passage in the main pressure line leading to the wheel brake in another switch position.

3 Claims, 4 Drawing Sheets

HYDRAULIC BRAKE SYSTEM WITH SLIP CONTROL

BACKGROUND OF THE INVENTION

The present invention relates to a hydraulic brake system with slip control.

The discontinuous pressure fluid control in slip-controlled brake systems by way of digitally operated inlet and outlet valves produces an undesirable emission of sound due to the pulse-like pressure variation.

Therefore, various arrangements to reduce noises during anti-lock/traction slip control operations have been disclosed. In this respect, reference is made to international patent application WO-A-90/12713, as an example. This application discloses the arrangement of pressure pulsation dampers inside the main pressure lines, and for that matter, in the vicinity of the braking pressure generator, or in the by-pass line of the electromagnetic inlet and outlet valves. The pressure pulsation dampers used are configured as vibration-damping elastomeric energy-accumulating elements which, by way of their defined expansion in volume, flow length and restricting properties, shall prevent the transmission of sounds produced by valve switching frequencies to the mass-loaded and, thus, vibrating brake system.

A relatively soft pedal feel and an increased pedal travel are undesirable consequences of the additional pressure fluid volume input caused by the given pressure pulsation dampers during braking operations.

European patent application No. 0 317 305 discloses a solenoid valve which is appropriate for use in anti-lock hydraulic brake systems. The solenoid valve includes a magnetic core accommodating a coil which is confined by a magnetic armature on one side and by a diaphragm member on the other side. The diaphragm member has a passage closable by a valve needle. The diaphragm member is axially movably arranged between the magnetic core and a housing cover containing the pressure fluid inlet. Thus, in the switch position of the valve needle closing the supply channel in the diaphragm member, a pressure differential is operative on both sides of the diaphragm member and causes a displacement of the valve needle relative to the magnetic armature. This fact preloads a compression spring compressed between the valve needle and the magnetic armature. The preloading force of the compression spring, caused by the difference in pressure on the diaphragm member, causes rapid release of the magnetic armature from the magnetic core when the electromagnetic energization is interrupted. The result is short valve opening times. A spring restoring force acting on the valve needle in the opening sense assists the rapid opening of the supply channel in the diaphragm member so that pressure fluid, after having passed the open passage across the valve needle, propagates to an annular slot which is formed between the hollow cylindrical inside wall of the magnetic core and the outside wall of a cylindrical part which guides the valve needle. The fluid emanating from the valve inlet is conducted to a pressure fluid connection leading to the pressure fluid consumer by way of the supply channel in the diaphragm member and the subsequent annular slot.

UK patent application No. 2 252 140 discloses a valve assembly for anti-lock control including an inlet valve and an outlet valve. The inlet valve accommodates an annular piston adapted to be actuated in response to hydraulic pressure differences. The piston is configured as a stepped piston which is pressure-balanced, subjected to the hydraulic pressure of the master cylinder. A compression spring interposed between the valve carrier of the electromagnetically operable inlet valve and the annular piston keeps the annular piston in an unrestricted open position, with the result that pressure fluid is unimpeded to flow from the master cylinder to the wheel brake. When the inlet valve is energized electromagnetically, the valve closure member of the inlet valve adopts its closed position, and the electromagnetically energized outlet valve discharges the wheel braking pressure in the direction of a supply reservoir. This reduces the level of wheel pressure which is conducted from a branch line of the outlet valve to a piston step on the annular piston. Thus, the annular piston is no more pressure-balanced and, with its sealing seat, closes the originally unimpeded pressure fluid passage in the inlet valve from the master cylinder to the wheel brake in opposition to the effect of the compression spring. A new pressure increase in the wheel brakes occurs by pulsed operation of the magnetic coils of the inlet valve so that pressure fluid propagates in a restricted fashion to the wheel brake by way of the orifice bore in the annular piston. To this end, the outlet valve is in an operating position in which the connection to the supply reservoir is closed. Upon deactivation of the master cylinder, the annular piston adopts again a position in which the pressure fluid connection to the wheel brake is unrestrictedly open because the compression spring positions the annular piston on its stop.

The chosen channel arrangement and pressure fluid ducts to provide a connection between the master cylinder, the inlet and outlet valve and the wheel brake necessitates a structural series arrangement of the individual elements in the inlet valve. Also, the selected switching function of the annular piston in response to the amount of pressure conducted from the wheel brake by way of the outlet valve necessitates the chosen arrangement.

SUMMARY OF THE INVENTION

Therefore, an object of the present invention is to maintain a simple basic structure of the customary brake systems with slightest possible modifications and to provide a solution to effectively minimize noises, which are responsive to the valve operating positions, and the propagation of noise.

Thus, the present invention is based on the idea to reduce the pressure pulses of different intensities, which are caused by the switching frequencies of the pressure modulation valves, in response to the difference in pressure between the wheel brake and the braking pressure generator, by way of a switchable orifice or throttle member to the end of varying the opening cross-section between the inlet valve, and, if necessary, also the outlet valve, and the wheel brake.

Further features, advantages and possible applications of the present invention can be seen in the following description of several embodiments.

BRIEF DESCRIPTION OF THE DRAWINGS

In the drawings,

FIG. 1 is a hydraulic circuitry for the brake system of the present invention,

DETAILED DESCRIPTION OF THE INVENTION

Figure 1A:
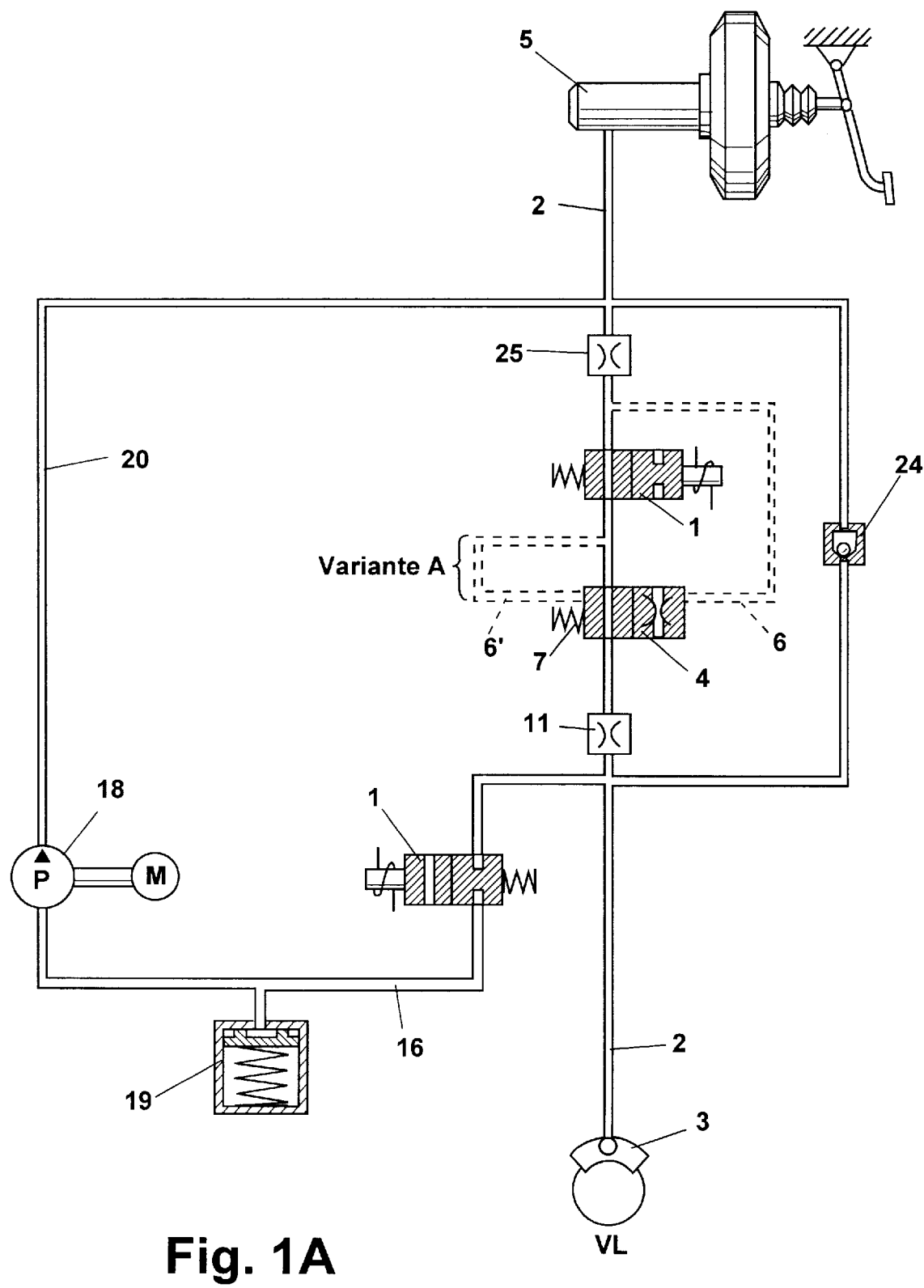
FIG. 1a representing Variant A of the circuitry.
Figure 1B:
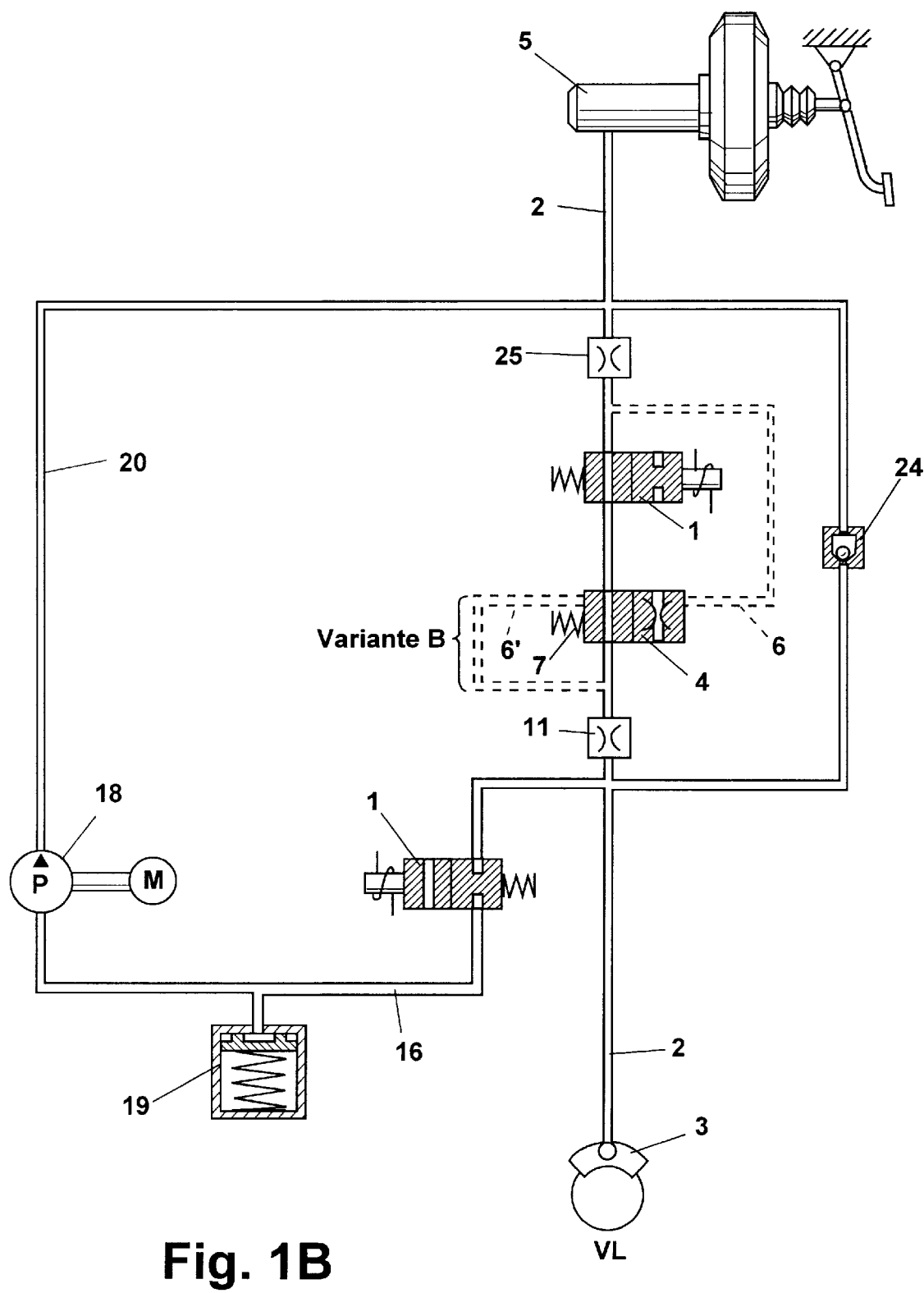
FIG. 1b representing Variant B of the circuitry.

FIG. 1 shows schematically a hydraulic diagram of the brake system of the present invention. A braking pressure generator 5 is connected to a wheel brake 3 by way of a main pressure line 2. An electromagnetic, normally open pressure modulation valve 1 acting as an inlet valve and an orifice 4 which is connected downstream of the pressure modulation valve 1 and is inoperative in its basic position are included in the main pressure line 2. The switchable orifice 4 is represented as a two-way/two-position directional control valve. A first control pressure port 6 of the valve is acted upon by the pressure of the braking pressure generator 5, and an oppositely acting second control pressure port 6' of the two-way/two-position directional control valve is acted upon by the pressure in the wheel brake. The control pressure port 6' can also be connected to the main pressure line 2 between the pressure modulation valve 1 and the orifice 4 (variant A) as an alternative of the connection (as shown) of the second control pressure port 6' downstream of, i.e. after, the switchable orifice 4 (variant B), when viewed in the drawing. Advantageously, an invariable orifice 11 is arranged downstream of, i.e. after, the control pressure port 6' to prevent an excessively great difference in pressure upstream and downstream of the orifice 4 from becoming effective in the slip-free normal braking mode upon quick application of the brake. Undesirable throttling effects are thereby avoided. In case of need, an invariable orifice 25 can also be inserted into the main pressure line 2 upstream of, i.e. before, the inlet valve. Exactly as the above-mentioned invariable orifice 11, this last mentioned invariable orifice is calibrated related to the vehicle and, typically, can be sized somewhat larger in its cross-section than the invariable orifice 11. This prevents a premature undesirable switchover and, thus, coming into effect of the switchable orifice 4 in all possible operating conditions. A compression spring 7, represented on the two-way/two-position directional control valve, ensures an initially unthrottled pressure fluid passage to the wheel brake 3 in the brake release position and the normal position. Further, a return line 16 is connected to the wheel brake 3 to extend to the suction side of an auxiliary-pressure pump 18 by way of an electromagnetically operated pressure modulation valve 1 which is closed in its basic position and acts as an outlet valve. To reduce the noise of the electromagnetically operable outlet valve, a switchable orifice 4 having corresponding control lines acted upon by the pressure in front of and behind the outlet valve may be arranged, exactly as has been described in detail with respect to the inlet valve. Because by far smaller pressure variations in front of and behind the outlet valve will occur in the pressure control mode, however, the noise damping measure, proposed with respect to the inlet valve, regarding an arrangement of an orifice connected downstream of the wheel brake 3 on the outlet side is not absolutely necessary.

Further, the return line 16 includes a low-pressure accumulator 19 for the intermediate storage of excessive pressure fluid. The pressure side of the auxiliary-pressure pump 18 is connected to the braking pressure generator 5 or, in turn, the main pressure line 2, by way of an auxiliary-pressure line 20. The valve switching position according to the present invention renders it possible to reduce the valve switching noises otherwise caused in the pressure modulation valve 1 (inlet valve) as soon as the orifice 4 in the main pressure line 2 becomes operative during the switching operation of the inlet valve and in response to a change-over point defined by construction. It is provided, by way of defined design criteria of the brake system, to activate the orifice function, for example, with an increasing pressure difference on the pressure modulation valve 1 of more than 15 bar.

Based on the general hydraulic circuit design of the brake system of the present invention, suitable valve constructions will be described in the following by way of FIGS. 2 to 5.

Figure 2:
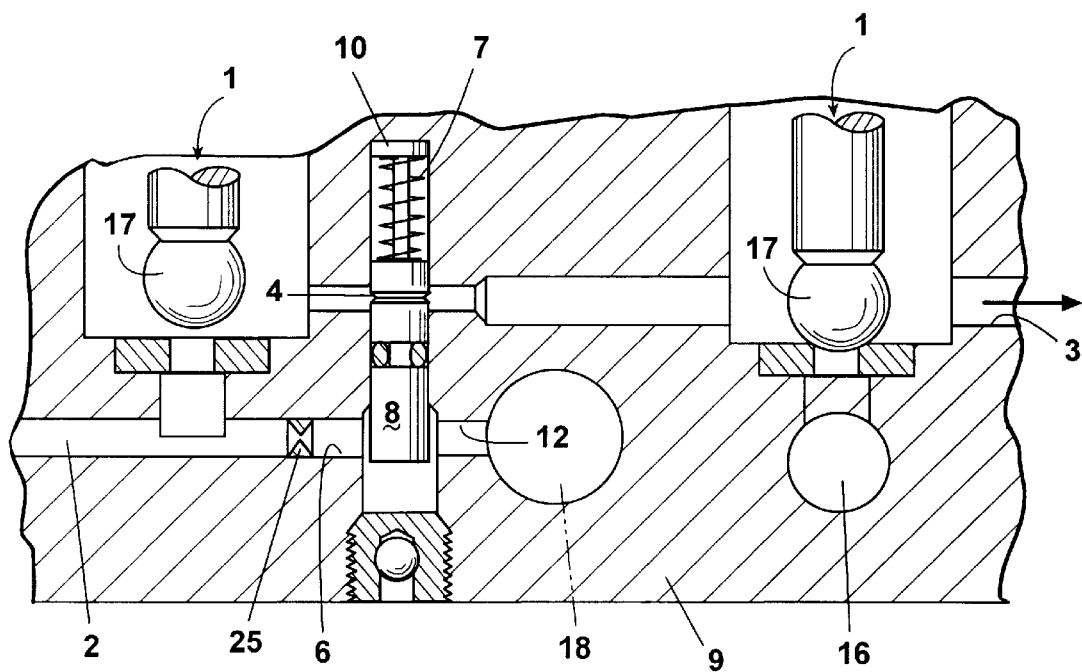
FIG. 2 is a partial cross-sectional view of a valve accommodating member for the brake system of the present invention.

FIG. 2 shows, in a cross-section taken through a valve accommodating member 9, two structurally parallel arranged pressure modulation valves 1. The pressure modulation valve 1 shown in the left of the drawing functions as an inlet valve, and the pressure modulation valve 1 shown in the right of the drawing functions as a normally closed outlet valve. The two pressure modulation valves 1 are hydraulically interconnected by way of a pressure fluid channel, and a blind-end bore is arranged transversely to the pressure fluid channel to accommodate a slide piston 8. Preferably on its peripheral surface, the slide piston 8 has a circumferential throttling notch which takes the function of the switchable orifice 4. In the drawing, the slide piston 8 abuts with its first frontal end on a stop 10 inserted in the blind-end bore. Stop 10 accommodates a compression spring 7 which is supported on the frontal end of the slide piston 8. Opposite to the first frontal end, the further frontal end of the slide piston 8 is alternatively acted upon by the pressure of the main pressure line 2, as a control pressure, and, if necessary, by the pump pressure which propagates also in the direction of the main pressure line 2 through the pump pressure line 12. Thus, the channel portion arranged between the invariable orifice 25 and the slide piston 8 functions as the control pressure port 6. The invariable orifice 25 calibrates the pressure fluid flow rate to the slide piston 8 so that an undesirable premature switching of the orifice 4 due to a quick brake application is prevented. The valve closure member 17 of the inlet valve, which is open in the initial position, permits an unimpeded pressure fluid supply in the direction of the wheel brake 3 by way of the normally closed pressure modulation valve 1 (outlet valve), because the compression spring 7 initially keeps the connecting channel between both pressure modulation valves 1 unrestrictedly open in the basic position of the slide piston 8. The position of the slide piston 8, as shown in the drawing, will be achieved only by a considerable rise in pressure in the main pressure line 2 or in the pump pressure line 12. When the slide piston 8 is immersed in the blind-end bore, hydraulic attenuation of the slide piston 8 is caused. Normally, the difference in pressure on the two frontal ends of the slide piston 8 is at least 15 bar in the orifice switching position. In addition to the constructive design of the present invention as shown, a non-return valve opening in the direction of the main pressure line 2 may be inserted upstream of the invariable orifice 25, with the result that pressurization for control of the slide piston 8 on its bottom frontal end is exclusively caused by the pressure in the pump pressure line 12.

Figure 3:
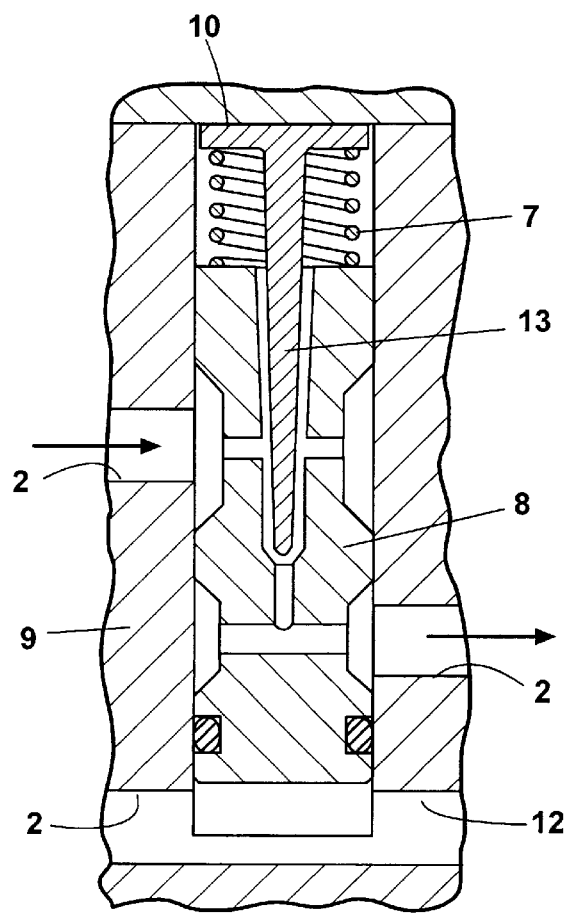
FIG. 3 is another partial view of the valve accommodating member for an alternative embodiment with a switchable orifice in the form of a slide piston.

FIG. 3 shows another embodiment of a switchable orifice in the form of a member which acts as a throttle needle 13 that is also immersed into a slide piston 8. Slide piston 8 is modified compared to FIG. 2. Regarding the pressure fluid ports, the design corresponds largely to the basic design of the valve accommodating member 9 known from FIG. 2. Thus, the main pressure line 2 and the pump pressure line 12 in FIG. 3 are also connected downstream of the slide piston 8 in order to effect a travel-responsive continuous restriction of the pressure fluid, which flows from the pressure modulation valve 1 (inlet valve) to the slide piston 8, the restriction being responsive to the pressurized frontal end remote from the stop 10. Thus, responsive to the stroke of the slide piston 8, a defined quantity of pressure fluid is conducted to the second pressure modulation valve 1 (outlet valve) by way of transverse and longitudinal bores in the slide piston 8. In the brake release and slip-free normal braking position, the compression spring 7 arranged above the slide piston 8 keeps the slide piston 8 in its bottom position so that the throttle needle 13 attached to the stop 10 is immersed only slightly into the slide piston 8 and is passed by fluid in an initially unrestricted manner by way of the piston's transverse and longitudinal bores. As mentioned in FIG. 2, the throttling position of the slide piston 8 is caused either by a defined increase in pressure in the main pressure line 2 or by the pressure in the pump pressure line 12. Thus, when the pump pressure is utilized, exclusively the magnitude of the pump pressure and the spring force of the compression spring 7 would be most important for the respective position of the slide piston 8.

Figure 4:
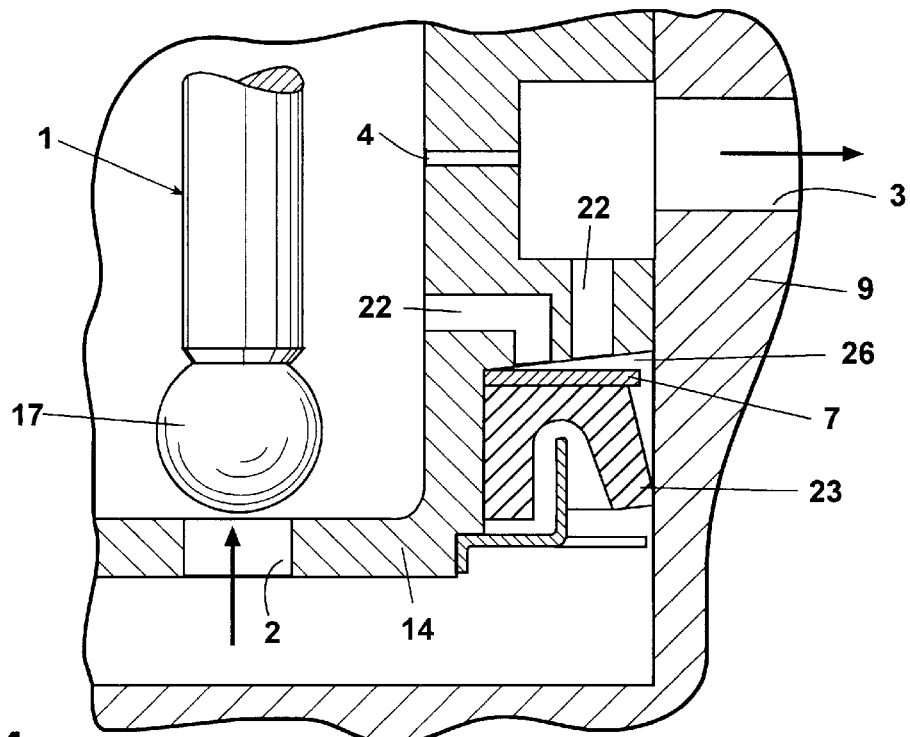
FIG. 4 is the arrangement of a switchable orifice inside a pressure modulation valve.

FIG. 4 shows a particularly compact design of the circuit known from FIG. 1 in a partial cross-section taken through a pressure modulation valve 1 (inlet valve). With the valve closure member 17 of the pressure modulation valve 1 being switched to provide an unimpeded fluid passage in the basic position, pressure fluid can propagate from the main pressure line 2 in the direction of the wheel brake 3 by way of the orifice 4 in the valve carrier 14 and a closable channel 22. The special features of the present invention involve that the channel 22 is arranged in different planes of the valve carrier 14 so that, preferably, the first portion of the channel 22 provides a connection to a hollow chamber 26 having an annular sleeve 23 by way of the open valve closure member 17. The second portion of channel 22 connects the hollow chamber 26 to the main pressure line 2 which leads to the wheel brake 3. The two portions of the channel 22 are offset in relation to each other, for example, by roughly 90 degrees, so that in the presence of only a slight difference in pressure upstream and downstream of the annular sleeve 23, a compression spring 7, in the capacity of a cup spring, initially keeps the hollow chamber 26 open (that interconnects the two portions of the channel 22), until the hydraulic pressure below the annular sleeve 23, which corresponds either to the pressure in the main pressure line 2 or the pressure in the pump pressure line 12, closes the two portions of the channels 22 in opposition of the compression spring 7. Thus, there is exclusively a pressure fluid connection between the pressure modulation valve 1 (inlet valve) and the wheel brake 3 by way of the orifice 4.

Figure 5:
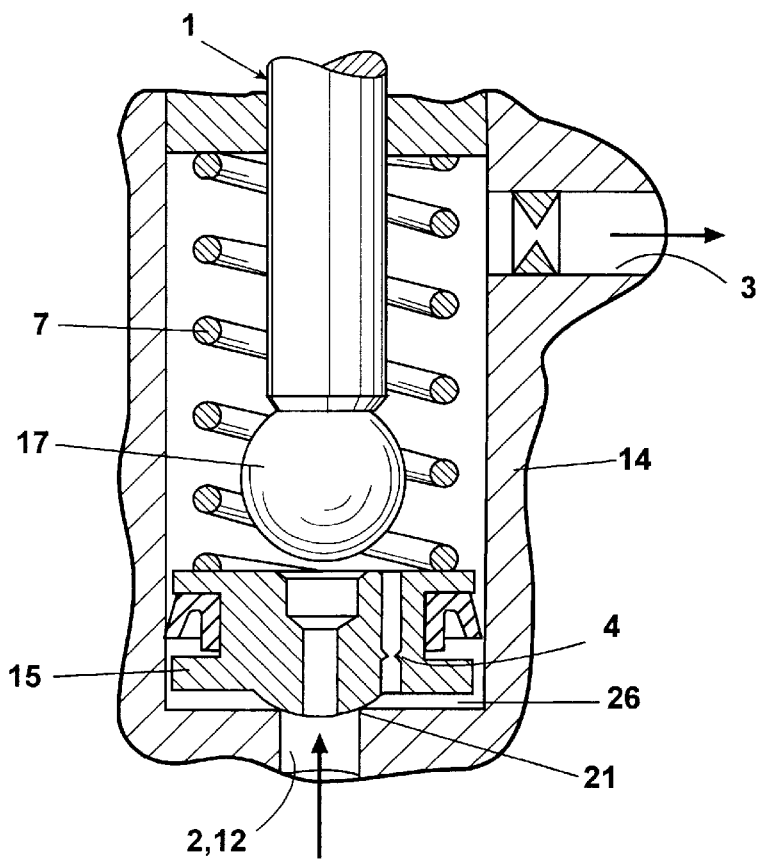
FIG. 5 is another design variant of a switchable orifice which is arranged in a valve seat member.

Another design variant for the integration of the switchable orifice 4 in the pressure modulation valve 1 can be seen in FIG. 5. The orifice 4 is a component of an axially movable valve seat member 15 which is slidable in opposition to the effect of a compression spring 8 in the valve carrier 14 of the pressure modulation valve 1. The valve seat member 15 has two sealing seats, a first sealing seat being provided by the interaction of the valve closure member 17 with a through-bore in the valve seat member 15. In the direction of the valve closure member 17, the through-bore has a diameter which corresponds to the diameter of the sealing seat 21 remote from the valve closure member 17 so that the axially movable valve seat member 15 is hydraulically pressure-balanced in its basic position. The sealing seat 21 is arranged on the mouth of the main pressure line 2 or the pump pressure line 12 into the valve carrier 14 so that, with slight differences in pressure in front of and behind the valve seat member 15, the sealing seat 21 closes the hydraulic connection between the main pressure line 2 or the pump pressure line 12 and the hollow chamber 26 arranged below the valve seat member 15.

Thus, in the slip-free normal braking position, the parts described adopt their position as shown in the drawings, so that pressure fluid coming from the main pressure line 2 is not impeded to flow in the direction of the wheel brake 3 by way of the through-bore of the valve closure member 17 that is in its open position. In the pressure maintain-constant phase, the valve closure member 17 closes the through-opening in the valve seat member 15 so that the valve seat member 15 remains in its position, as shown in the drawing In the pressure increase phase of a braking pressure control operation, the valve closure member 17, in turn, is in its open position. Starting from a defined difference in pressure on both frontal ends of the valve seat member 15, the valve seat member is displaced until it abuts on the valve closure member 17, and the sealing seat 21 simultaneously opens the passage from the main pressure line 2 to the orifice 4 exclusively. Subsequently, for braking pressure reduction, release of the brake pedal causes an unimpeded supply of pressure fluid from the wheel brake 3 in the direction of the main pressure line 2 by way of the annular sleeve arranged on the valve seat member 15. Due to the front end of the valve seat member 15 remote from the valve closure member 17 being relieved from pressure, the valve closure member with its sealing seat 21 abuts again on the valve carrier 14 under the effect of the compression spring 7.

What is claimed is:

1. Hydraulic brake system with slip control, including a braking pressure generator that is connected hydraulically to at least one wheel brake by way of a main pressure line, a return line connected to the wheel brake and in communication with a pressure fluid collecting means at a suction side of an auxiliary-pressure pump, the auxiliary-pressure pump having an auxiliary-pressure line that is connected to the braking pressure generator, at least one pressure modulation valve acting in the main pressure line and in the return line to close or keep open the pressure fluid passage in the main pressure line and the return line, and a controllable orifice in the main pressure line between said at least one pressure modulation valve and the wheel brake that is operative in response to a difference in pressure, an unimpeded hydraulic passage between the braking pressure generator and the wheel brake being provided in a first switch position of the pressure modulation valve, and the orifice limiting the pressure fluid passage in the main pressure line leading to the wheel brake in another switch position of the pressure modulation valve, wherein the orifice is arranged in a valve carrier, and the valve carrier includes an annular sleeve and a channel closable by the annular sleeve in response to the difference in pressure, the channel normally connecting the main pressure line through to the wheel brake by way of the open pressure modulation valve in such a manner that pressure fluid is conducted from the braking pressure generator in the direction of the wheel brake both by way of the orifice and the closable channel.

2. Hydraulic brake system as claimed in claim 1, characterized in that interposed between the annular sleeve and the channel is a cup spring which acts as a compression spring and is mounted on the valve carrier of the pressure modulation valve.

3. Hydraulic brake system as claimed in claim 1, characterized in that the valve carrier accommodates the valve seat member of the pressure modulation valve.

* * * * *